(12) United States Patent
Ryznar et al.

(10) Patent No.: US 7,515,981 B2
(45) Date of Patent: Apr. 7, 2009

(54) LIGHT GUIDED ASSEMBLY SYSTEM

(75) Inventors: Paul Ryznar, Northville, MI (US);
James Ryznar, Belleville, MI (US)

(73) Assignee: OPS Solutions LLC, Northville, MI (US)

( * ) Notice: Subject to any disclaimer, the term of this patent is extended or adjusted under 35 U.S.C. 154(b) by 0 days.

(21) Appl. No.: 11/909,002

(22) PCT Filed: Oct. 6, 2006

(86) PCT No.: PCT/US2006/039215

§ 371 (c)(1),
(2), (4) Date: Sep. 18, 2007

(87) PCT Pub. No.: WO2007/044558

PCT Pub. Date: Apr. 19, 2007

(65) Prior Publication Data

US 2008/0121168 A1  May 29, 2008

Related U.S. Application Data

(60) Provisional application No. 60/724,858, filed on Oct. 7, 2005, provisional application No. 60/818,058, filed on Jun. 30, 2006.

(51) Int. Cl.
*G06F 19/00* (2006.01)
*B23Q 15/00* (2006.01)

(52) U.S. Cl. .................. 700/95; 700/115; 700/116; 29/707; 29/709

(58) Field of Classification Search .............. 29/592, 29/593, 407.1, 407.04, 428, 429, 700, 703, 29/707, 709, 712, 720; 700/95, 115, 116
See application file for complete search history.

(56) References Cited

U.S. PATENT DOCUMENTS

| 2,682,117 | A |   | 6/1954  | Wales           |           |
|-----------|---|---|---------|-----------------|-----------|
| 3,600,785 | A |   | 8/1971  | Cook            |           |
| 3,623,066 | A |   | 11/1971 | Norris          |           |
| 3,667,104 | A |   | 6/1972  | Chamillard et al. |         |
| 3,986,244 | A | * | 10/1976 | Latanzi         | 29/407.04 |
| 4,102,568 | A |   | 7/1978  | Miyagi          |           |
| 4,163,309 | A |   | 8/1979  | Stuckler        |           |
| 4,222,036 | A |   | 9/1980  | Troukens        |           |

(Continued)

OTHER PUBLICATIONS

International Search Report and Written Opinion of the International Searching Authority for International Application No. PCT/US2006/39215, Jun. 1, 2007.

*Primary Examiner*—David N Spector
(74) *Attorney, Agent, or Firm*—Van Dyke, Gardner, Linn & Burkhart LLP

(57) ABSTRACT

An operational guide system (10) adapted to provide visual indicators to an individual to guide sequential actions includes at least one sensor apparatus (26), a controller (20), and at least one directional light device (22, 24). The sensor apparatus (26) is operable to detect operation information and generate an output indicative of the sensed operation information. The controller (20) receives at least a first input signal indicative of the operation information and selectively provides at least one command signal in response to the first input signal. The at least one directional light device (22, 24) being selectively operable to project and target at least one indicating light in response to the at least one command signal from the controller (20).

25 Claims, 6 Drawing Sheets

U.S. PATENT DOCUMENTS

| | | |
|---|---|---|
| 4,318,222 A | 3/1982 | Frohlich |
| 4,469,553 A | 9/1984 | Whitehead |
| 4,890,382 A * | 1/1990 | Anderson et al. ............. 29/833 |
| 5,119,536 A | 6/1992 | Leitz et al. |
| 5,430,662 A | 7/1995 | Ahonen |
| 5,506,641 A | 4/1996 | Dorsey-Palmateer |
| 5,801,946 A | 9/1998 | Nissen et al. |
| 5,910,894 A | 6/1999 | Pryor |
| 6,224,385 B1 | 5/2001 | Nitta et al. |
| 6,658,218 B2 | 12/2003 | Krolczyk et al. |
| 7,027,886 B2 * | 4/2006 | Hoppes et al. .............. 700/108 |
| 2003/0073541 A1 | 4/2003 | Carlson |

* cited by examiner

Pre-assemble
> <
FIG. 1A
← Left
FIG. 1H
Select
FIG. 1B
Right →
FIG. 1I
Insert
FIG. 1C
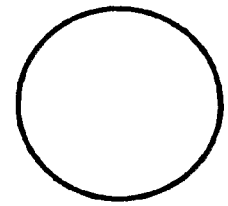
FIG. 1J
Assemble
FIG. 1D
Pick
FIG. 1E
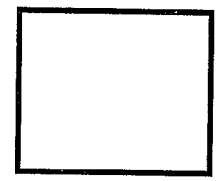
FIG. 1K
Gauge
FIG. 1F
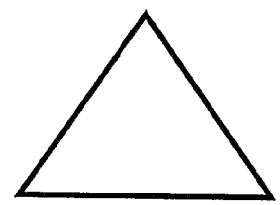
FIG. 1L
Torque
FIG. 1G

LIGHT GUIDED ASSEMBLY SYSTEM

CROSS REFERENCE TO RELATED APPLICATIONS

The present application is a 371 national phase application of PCT Application No. PCT/US2006/39215, filed Oct. 6, 2006, which claims benefit of U.S. provisional application, Ser. No. 60/724,858, filed Oct. 7, 2005, and of U.S. provisional application Ser. No. 60/818,058, filed Jun. 30, 2006, which are all hereby incorporated herein by reference in their entireties.

BACKGROUND OF THE INVENTION

The present invention is directed to a system for guiding an individual in the performance of operational steps, and in particular a system that provides visual indicators to the individual.

Numerous activities involve the performance of pre-designated operational steps to properly complete a particular task, with some such activities needing to be completed within a specified or standard time allowance. For example, in a manufacturing environment the selection and assembly of components to a work piece must be properly completed to satisfy the specified design criteria of the work piece. Numerous problems arise when such activities are improperly performed either from a workmanship standpoint and/or outside the standard time allowance. In the case of workmanship, if the problem is not discovered prior to shipment of the work piece, a failure in the field may occur that can result in significant warranty costs to the manufacturer. If the problem is discovered prior to shipment, the work piece may have to be scrapped or require re-work operations, both of which add significant and undesirable cost and complexity to the manufacturing operations. In the case of failure to meet a standard time allowance, the entire assembly process may become unbalanced resulting in costly bottlenecks, excess inventory, and additional workmanship risk.

Several methods of preventing the improper assembly of a work piece exist. One such method is the use of automated machine vision systems that utilize cameras to compare a work piece to the preprogrammed specification of a properly assembled work piece. Automated machine vision systems, however, are expensive and are highly customized such that they are only able to handle a limited assortment of work pieces. Other types of systems may involve human inspection of work piece products. Such systems inherently involve human error such that a higher degree of nonconforming parts may go undetected. Furthermore, when human inspection systems are constructed as separate "inspection stations" apart from the value added work operations, manufacturing costs are increased by allowing nonconforming work pieces to leave work stations.

In addition to manufacturing assembly operations, numerous other activities involve human performance of particular tasks that are desired to be performed without omitting any steps. Such activities include, by way of example only, the testing or measuring of various components, packaging products, preparation and production of food and chemical goods, air flight checklist activities, the proper performance of critical safety routines, and multi-person choreographed physical activities.

Therefore, a cost effective and flexible method of providing guidance to individuals performing tasks is desired whereby the occurrence of missed or improperly performed steps is reduced.

SUMMARY OF THE INVENTION

The present invention provides an operational guide system or assembly guide system adapted to provide visual indicators to an individual to guide sequential actions at a work location. According to one aspect of the present invention, an operational guide system comprises at least one sensor apparatus operable to detect operation information and generate an output indicative of the operation information, a controller receiving at least a first input signal indicative of the operation information and selectively providing at least one command signal in response to the first input signal, and at least one directional light device selectively operable to project and target at least one indicating light in response to the at least one command signal from the control module.

The at least one indicating light may be provided to an operator performing an assembly action on a work piece at a work station. The at least one indicating light may be projected at the work piece to indicate an operation step location. The operation step location may indicate where a component is to be assembled to the work piece or where an operation step is to be performed by an operator. The operation step may comprise a fastening step, a testing step, or a tool selection step.

The controller may be adapted to receive at least one confirmation signal indicative of a completion of an assembly action, the at least one confirmation signal being either a manually input signal and an automated input signal. A manual input signal may be transmitted by an operator in response to completion of an assembly action by the operator selectively actuating a foot pedal and a push button. An automated input signal may be transmitted by a machine vision system, a light curtain, or a confirmation sensor.

The at least one indicating light may be selectively configurable to form at least one selected from the group consisting of a number, a word, a letter, a shape, a figure, a picture, an animation, or a video.

According to another aspect of the present invention, an operational guide system adapted to provide visual indicators to an individual to guide sequential actions comprises, a controller, at least one directional light device, and a controller. The controller adapted to selectively providing at least one command signal in response with the at least one directional light device being selectively operable to project and target at least one indicating light in response to the at least one command signal from the controller. The controller being programmable via at least one program screen displayable on a display device, the at least one program screen including at least one input field for entering and/or selecting indicia regarding sequential actions. The controller being further adapted to display at least one display screen on the display device during operation of the operational guide system, with the display screen being adapted to display indicia regarding sequential actions to be performed.

According to another aspect of the present invention, an operational guide system adapted to provide visual indicators to an individual to guide sequential actions comprises, a controller, at least one display device, at least one directional light device, and a controller. The controller adapted to selectively providing at least one command signal in response to the first input signal with the at least one directional light device being selectively operable to project and target at least one indicating light in response to the at least one command signal from the controller. The at least one display device being operable to display information regarding the sequential actions. The information displayed by the display device may include, for example, descriptive text regarding the sequential actions, a listing of sequential actions, animation and/or videos, part drawings. The display device may be configured as a touch screen to enable an operator to interact with the operational guide system via the touch screen.

According to another aspect of the present invention, a method for guiding assembly actions by providing visual indicators includes identifying a characteristic of a work piece requiring assembly actions and communicating identification information to a controller in response to the identification of the presence of the work piece. The method further includes communicating a first command signal to at least one directional light device in response to the identification information and selectively projecting at least one indicating light via the directional light device in response to the first command signal. The method also includes communicating a confirmation signal to the control module upon completion of a first operation step.

The method for guiding assembly actions may also include displaying at least one display screen on a display device with the display screen being adapted to display indicia regarding sequential actions to be performed.

The operational guide system of the present invention thus provides a cost effective and accurate method of guiding an individual through a series of tasks and provides confirmation that the tasks have been fully completed in the proper order. The operational guide system is useful in a wide array of applications, such as assembly, packaging, process preparation, and the like. Furthermore, the ability of the assembly guide system to recognize the presence, type, and/or relative position of a part present at a work station provides a flexible system that enables different types or models of parts to be processed at a particular work station, as well as provide notification to an operator of the presence of a work piece at the work station. The control module may also be used to monitor cycle times of the individual operational steps and combined operations undertaken at the work station, and to confirm that a proper part has been selected by an operator prior to proceeding to the next operational step. The operational guide system also provides an effective means of training individuals with regard to various activities, which is desirable in environments involving, for example, significant employee turnover and/or language and literacy barriers.

These and other objects, advantages, purposes, and features of this invention will become apparent upon review of the following specification in conjunction with the drawings.

BRIEF DESCRIPTION OF THE DRAWINGS

FIGS. 1A-1L illustrate exemplary images that may be projected by the light sources of the assembly guide system of FIG. 1;

DESCRIPTION OF THE PREFERRED EMBODIMENTS

Figure 1:
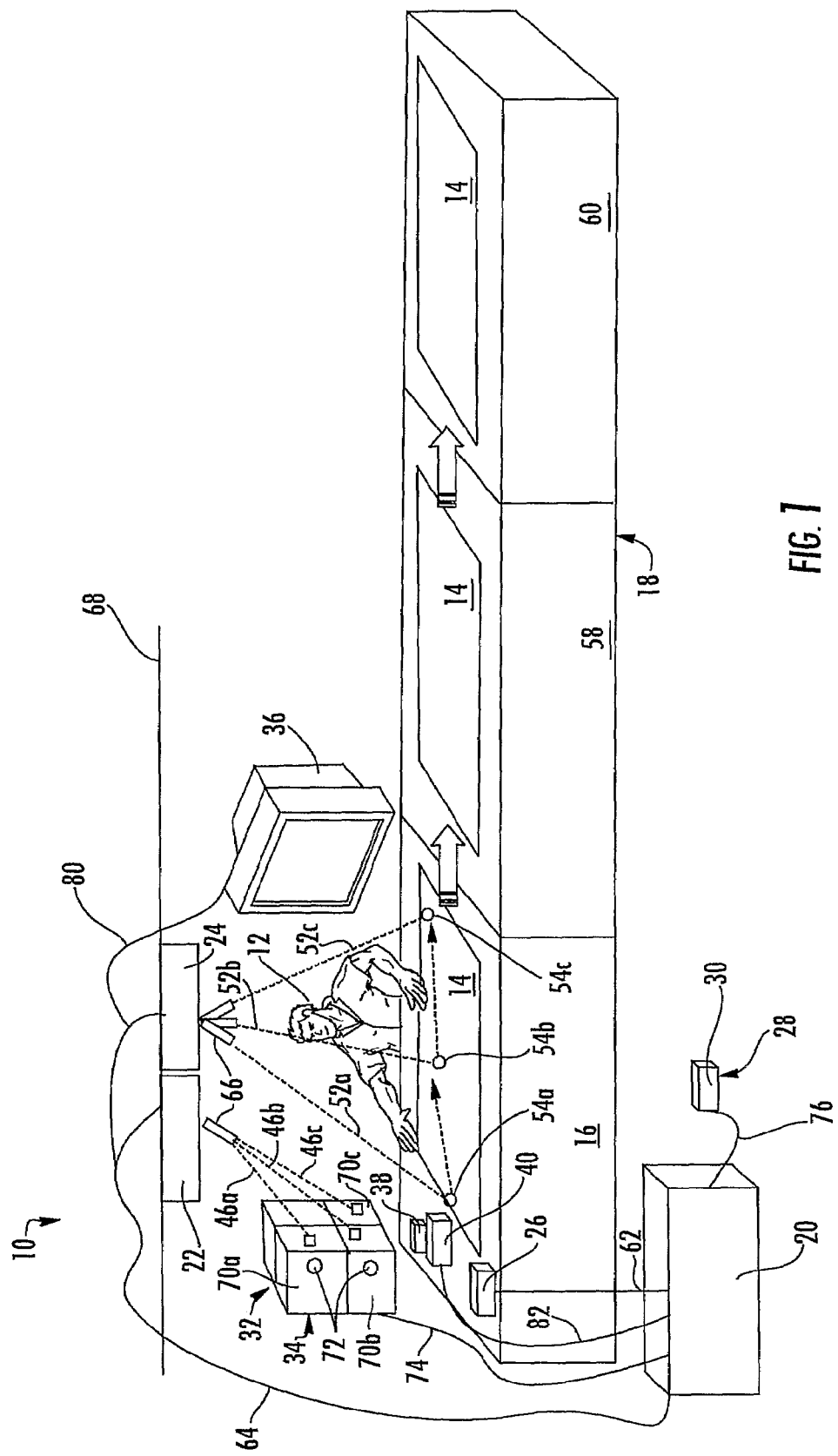
FIG. 1 is a perspective view of an operational guide system constructed as an assembly guide system at a work station of an assembly line in accordance with the present invention.

The present invention will now be described with reference to the accompanying figures, wherein the numbered elements in the following written description correspond to like-numbered elements in the figures. An operational guide system or assembly guide system 10 is illustrated in FIG. 1 in connection with the providing of visual indicators to an operator 12 performing one or more assembly actions on a work piece 14 at a work station 16 of an assembly line 18. The illustrated assembly guide system 10 includes a controller or a control module 20, two directional light devices 22, 24, a sensor apparatus 26, and a confirmation module or device or element 28, shown as a foot pedal 30. Assembly guide system 10 includes a component location 32, which is illustrated as a parts bin 34, a display device 36, and a tool 38 and tool holder 40.

Assembly guide system 10 is operable, in response to an operation information or characteristic or identification information associated with work piece 14 detected by sensor apparatus 26, to selectively provide indicating lights 46, 52 to guide an operator in the selection and/or assembly of parts to work piece 14, with the indicating lights 46, 52 being directed and/or provided based on, at least in part, the operation information detected by sensor apparatus 26. The system 10 is also or alternatively operable in response to one or more confirmation signals, such as confirmation signals 48, 56, and/or 84 of FIG. 2 that are described below, which may be manually or automatically supplied to control module 20 to verify completion of a particular operation or task. The system 10 is further operable via display device 36 to provide and relay information to operator 12 such as, for example, a listing of steps needing completion, work instructions, images of a work piece, videos, and/or warnings regarding a missed or improperly performed assembly step.

Figure 2:
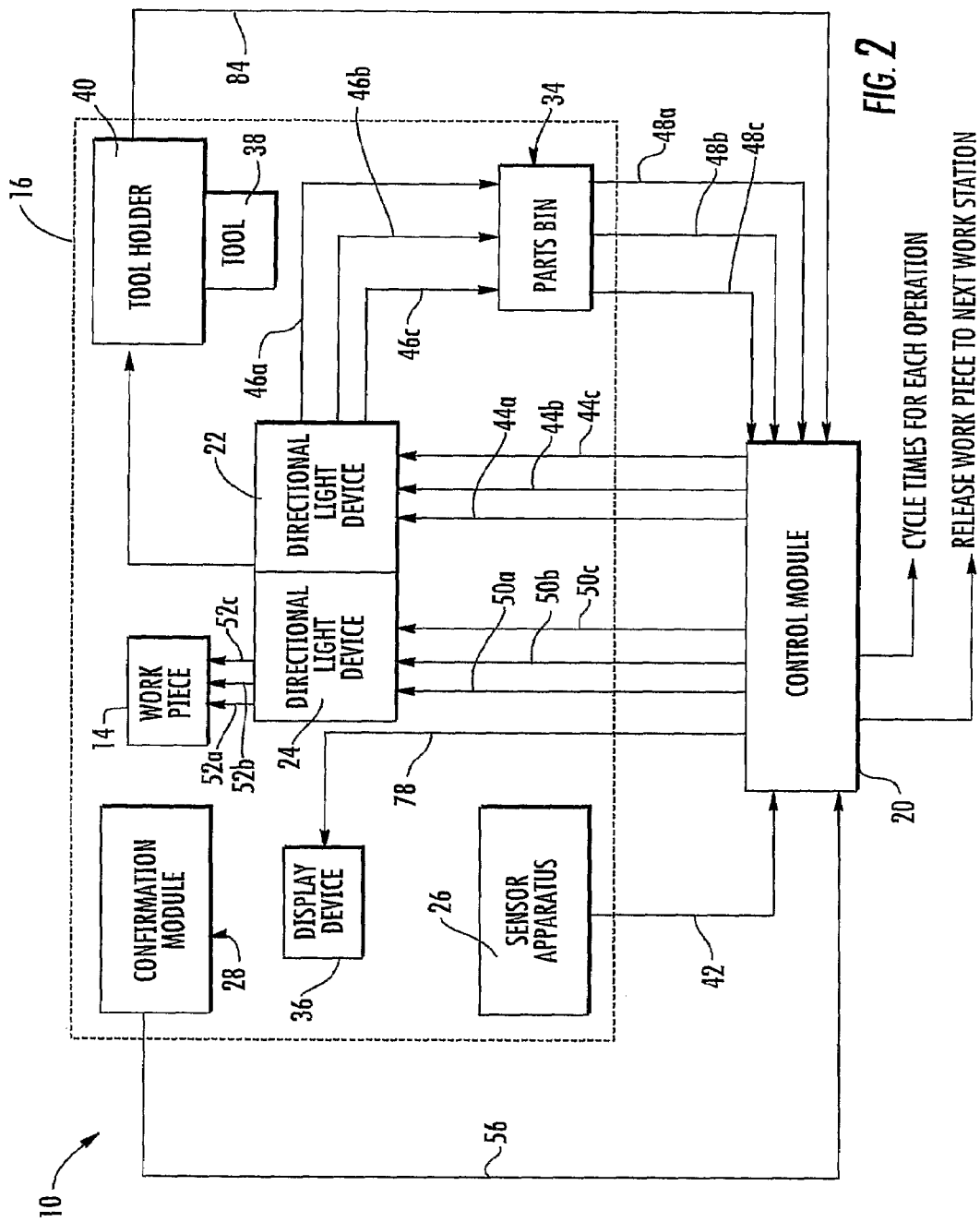
FIG. 2 is a schematic illustration of the operation of the assembly guide system of FIG. 1.

Referring to FIGS. 1 and 2, when work piece 14 initially enters work station 16, the sensor apparatus 26 detects an operation information or characteristic or identification information associated with the work piece 14, such as, for example, the presence of and/or the type of work piece 14 present at the work station 16. In response to the detection by sensor apparatus 26, a first input signal 42 is communicated or transmitted to the control module 20 and, based on the detected or identified work piece 14 that the operator 12 is or will be working on, the control module 20 communicates or transmits a command signal 44 (FIG. 2) to directional light device 22 to project an indicating light 46 at a location on parts bin 34 to guide the operator 12 to a part required for a particular step in the assembly action. After the proper part has been selected, a confirmation signal 48 (FIG. 2) is sent to the control module 20, the control module 20 then transmits a command signal 50 (FIG. 2) to directional light device 24 to project indicating light 52 to indicate the operational step location 54 on the work piece 14 where the selected component is to be installed. Upon completion of a particular operation step, the operator 12 actuates the foot pedal 30 to transmit a confirmation signal 56 (FIG. 2) to the control module 20 verifying that the operation step has been completed. The control module 20 may then send another command signal 49, 50 to one of the directional light devices 22, 24 to indicate the next operation step, or may release the work piece 14 to a subsequent work station 58, 60 for further operations if all required pick and assembly steps have been properly completed.

Assembly guide system 10 is able to provide visual indicators to operator 12 that are specific to a particular work piece 14 such that, for example, multiple different styles or types of work pieces requiring different components or parts may be processed at work station 16 with a significant reduction in the risk of the occurrence of assembly errors. The assembly guide system 10 thus provides a cost effective and accurate method of guiding an operator 12 through a series of tasks and provides confirmation that the tasks have been fully accomplished and completed in the proper order. Furthermore, the ability of the assembly guide system 10 to identify/recognize the presence and/or type of work piece 14 present at the work station 16 provides a flexible system that enables different types or models of work pieces to be processed at a particular work station 16, as well as provide notification to an operator 12 of the presence of the work piece 14 at the work station 16 and thereby improves throughput of the assembly line 18. The control module 20 may also be used to monitor cycle times of the individual operational steps and combined operations undertaken at the work station 16 for system productivity reporting, or the like.

Assembly guide system 10 is shown in FIG. 1 in connection with work station 16, where work station 16 is part of an assembly line 18 that includes additional work stations 58, 60 for performing subsequent operations. Although not shown, it should be appreciated that additional assembly guide systems could be included at the other work stations of assembly line, or that a single assembly guide system could be used to aid operations at more than one work station. Assembly line 18 may be constructed to transport work pieces 14 in an automatic fashion, such as by known chain, belt, or roller conveyors, or may require work pieces 14 to be manually moved by sliding rails, rollers, or the like. In addition, depending on the type of work piece and assembly line involved, the work pieces may be supported on a frame, tray, pallet, or the like, or may be supported directly on the assembly line.

As noted, sensor apparatus 26 functions to detect an operation information or characteristic or identification information associated with work piece 14, such as the presence and/or type of work piece 14 located at the work station 16, and may be constructed as one or more of a number of known sensors such as, for example, a proximity switch, light curtain, photo eye, radio frequency identifier device, bar code reader, or the like. When constructed as a radio frequency identifier device or bar code reader, a readable tag or bar code may be placed on either the work piece or the structure upon which the work piece is supported while traveling on the assembly line. The tag or bar code may contain information regarding the type of work piece at the work station, such as the model of the work piece, measurements related to the work piece, or the type of components required. A scanner or reader may be mounted to the assembly line, such as to framework of the assembly line, with the scanner being able to read the information from the tag or bar code when the work piece enters the work station. Alternatively, a sensor apparatus may comprise a vision system configured to detect an identifiable characteristic or identification information associated with a work piece. It should be appreciated, however, that operational guide system 10 may be activated or sequentially stepped to subsequent operations by non-automated signals. For example, an operator may manually enter a part type into the system, depress a palm button, press a touch screen, or simply commence operations or pre-operations on a part.

It should be appreciated, however, that the type of part present at a particular work station need not be determined using a bar code or radio frequency system. For example, and as is known in the art, standard binary type sensors may be used to detect geometrically distinguishing features of a work piece or the structure upon which it is located to "identify" the work piece. Alternatively, the sensor apparatus could include multiple components whereby one component would detect the presence of a work piece and another could detect the type of work piece. Still further, an assembly guide system could be constructed in accordance with the present invention where an operator uses a hand held scanner to scan a bar code label affixed to the work piece or the structure supporting the work piece as opposed to the scanner being mounted directly to the assembly line. The sensor apparatus may also be used to detect the relative orientation of a work piece with respect to the work station, with the control module adapted to receive the positional information and provide accordingly adjusted command signals to the directional light devices such that the projected indicating lights accurately impinge on the desired operational step locations. Still further, the presence of a part at a workstation may be supplied to the operational guide system by a manual operator activated input signal, such as by a touch screen, a palm button, or the like.

Control module 20, in the illustrated embodiment, is a computer controller device and as indicated is adapted to receive and send various signals to monitor and guide the assembly actions at work station 16. Control module 20 may be constructed as a desktop or laptop style PC, a PLC, or the like, or may be a networked computer system that may be used to control and monitor other aspects of the assembly line and work stations. It should be understood, however, that the control module may alternatively comprise a combination of interacting computer devices and still function as intended within the scope of the present invention. For example, a local computer device present at a particular work station may be adapted to receive and provide communication information with a network computer system associated with an assembly line, or other linked computer system.

As previously indicated, control module 20 is adapted to receive a first input signal 42 regarding identification information of the work piece present at the work station. In the illustrated embodiment of FIG. 1, the first input signal 42 is transmitted to the control module 20 directly from the sensor apparatus 26 along communication link 62, where link 62 is a computer cable, fiber optic line, or the like. Alternatively, however, a first input signal may be transmitted to a network computer system and, in response to the first input signal, the network system may provide the control module with the identification information regarding the work piece present at the work station. The identification information, as previously indicated, may simply indicate the presence of a part at the work station and/or may include information regarding the type of work piece at the work station, such as the model of the work piece, measurements related to the work piece, or the type of components required. Optionally, a sensor apparatus and control module may be alternatively constructed to wirelessly transmit and receive identification information such as the type, location, dimensions, or the like, of the work piece present at the work station without a link 62, such as via RF, IR, etc. communication.

In response to the first input signal 42 received, the control module 20 outputs command signals 44, 50 to directional light devices 22, 24 along link 64 to provide visual indicators to the operator, as described in more detail below, with the command signals 44, 50 being communicated based on, at least in part, the first input signal 42. In the illustrated embodiment, two substantially similar directional light devices 22, 24 are provided at work station 16 and are responsive to the command signals 44, 50 of the control module 20. Directional light device 22 is used to project indicating lights 46 at the component location 32, while the other directional light device 24 is used to project indicating lights 52 at operational step locations 54 on work piece 14. Each directional light device 22, 24 includes a light source 66 for projecting indicating lights 46, 52, with the directional light devices 22, 24 constructed such that the indicating lights 46, 52 may be selectively and movably positionable to direct the indicating light 46, 52 at pre-targeted locations. The light sources 66 may also be constructed to provide an indicating light beam of selectively adjustable brightness to compensate for ambient surroundings and/or the distance from the light source to the selected impingement point. Although light sources 66 are illustrated in FIG. 1 as projecting a single indicating light beam, it should also be appreciated that light sources 66 may be constructed to simultaneously project two or more beams such that, for example, multiple parts may be indicated for selection from location 32 by the operator 12 or multiple assembly locations may be indicated. For example, a single light device may include a light source configured to simultaneously project two or more indicating lights, which indicating lights, for example, may be for part selection and assembly guidance for different operation stations, or may be for part selection and assembly animation at a single operation station.

In the illustrated embodiment, light sources 66 are constructed as laser light sources that are able to project a focused, coherent beam of light at a desired location. Laser light sources may preferably be class 3 or lower lasers for employment within a visual setting for operators. A directional light device utilizing such a laser light source capable of producing variously configured and targeted indicating lights is available, for example, from Laser Compliance in Utah, while Phoenix Contact GmbH & Co. KG of Blomberg, Germany, for example, may be the supplier of all interface Input/Output Control between the shop floor and an operational guide system. Alternatively, light sources other than lasers may be used and still function as intended without affecting the scope of the present invention, such as incandescent lights, light emitting diodes (LEDs), or the like. Alternatively, a light source may be constructed as a Digital Light Processing (DLP®) projector, such as an industrial grade DLP® projector able to project signals of sufficiently high-lumens to be visible by an operator. Still further, a light source may be constructed as a liquid-crystal display (LCD) projector or an LED projector, or other form of high intensity light emitting device. It should also be understood that in embodiments incorporating more than one light source alternative types of light sources, such as laser, DLP®, and/or LCD, may be simultaneously and/or alternatively employed together.

In the illustrated embodiment, directional light devices 22, 24 are mounted to a mounting structure 68 to retain the directional light devices 22, 24 in a pre-determined and positively located orientation relative to the work station 16. The mounting structure 68 may comprise framework of the work station 16 or assembly line 18, or may be a structural element of the building, such as the roof or a wall, or may even be a separate stand, post, or pole.

Directional light devices 22, 24 may use controllable servo motors for movably positioning light sources 66 to selectively direct the indicating light 46, 52 in response to the command signal 44, 50 transmitted by the control module 20. Alternatively, directional light devices 22, 24 may include optical manipulation devices, such as adjustable mirrors, that function to selectively and movably position the projected indicating lights 46, 52 at the desired locations. Still further, alternative directional light devices may employ robotics to selectively position the light sources, with the robotics comprising robotic gantry or XYZ type arms, or the like. Alternatively, light devices may themselves be mounted to a robotic gantry or arm, or the like, for movably positioning the projected indicating lights.

Light sources 66 may be constructed such that they produce light of differing color from each other to provide further visual cues to the operator 12 while working at work station 16. For example, as illustrated in FIG. 1 the indicating light 46 produced by light source 66 of directional light device 22 may be used to project light at component location 32 and may be of a first color, and the indicating light 52 produced by light source 66 of directional light device 24 may be used to project light at operational step locations 54 on work piece 14 and be of a second color. In such an embodiment, the differing colors serve as a further visual indicator or cue to the operator 12 with one color representing part selection and the other color representing the location where the selected part is to be assembled. It should also be appreciated, however, that each light source 66 may project multiple different colors, such as green, red, yellow, and/or blue. Furthermore, light sources may be adapted to project animated images or videos onto a surface, such as a surface of the work piece 14, assembly line 18, or a work station 16, 58, 60. The projected animated images or videos may be, for example, a training video, and may be in a .mpeg, .wmv, or other such file format provided by or stored in, for example, a control module of an operational guide system.

Referring to FIGS. 1A-1L, the directional light devices 22, 24 may also include known optical effect devices for fanning or adapting or configuring the projected indicating lights 46, 52 produced by the light sources 66 into a desired shape, pattern, or form at the point or location at which the indicating light 46, 52 impinges the component location 32 or operational step location 54. For example, the indicating light may initially be projected as a geometric shape (FIGS. 1J-1L), such as a circle, about a particular location to quickly attract the operator's attention, and then focus to a point or circle of smaller diameter at the specific location. The indicating light may also be projected to produce alpha numeric characters, such as shown in FIGS. 1A-1I, blink, and/or produce rotating images. For example, sequential numbers may be projected where each number indicates a step in the assembly action being preformed by the operator at the work station, or part numbers or textual information may be projected to provide written guidance to the operator. The indicating lights may also be projected at an initially higher intensity level to attract the attention of an operator, with the intensity level being subsequently reduced after a brief period. Indicating lights projected by light sources, as described in more detail below, may further be configured to display videos or pictures or animation on the surface upon which the indicating light impinges.

As previously noted, indicating lights 46, 52 may be projected at component location 32 or at operation step locations 54 associated with work piece 14. Component location 32 is exemplified as a parts bin 34 having multiple storage locations 70 for holding various parts required in the assembly of work pieces 14. As shown, directional light device 22 is functional to selectively project an indicating light 46 at discrete storage locations 70 of parts bin 34 in response to command signal 44 to prompt the operator 12 regarding part selection. Although not shown, storage locations 70 of parts bin 34 may include luminescent tape, paint, reflectors, Radio Frequency Identification tags (RFID), or the like, onto which an indicating signal is directed for providing further contrasts or visual prompts to an operator.

RFID tags, or the like, may also be used to supply information to the control module 20. For example, an RFID tag located on a parts bin 34 may be used in connection with assembly guide system 10 for monitoring the presence and/or proper location of the parts bin 34. In the event assembly guide system 10 detected, such as by control module 20, the absence of parts bin 34 an error message could be, for example, displayed by display device 36, or projected by a light device 22, 24, or an audible warning message may be broadcast.

In the illustrated embodiment of FIG. 1, storage locations 70 of parts bin 34 include detection devices 72 that are intended to detect or sense when a component has been withdrawn from a particular storage location 70. Detection devices 72 may be of known construction and are selected based on a particular application, taking into consideration the types or models of work pieces 14 and parts to be assembled. Detection devices 72, for example, may comprise light curtains, proximity sensors, electronic mats, such as pressure sensitive mats, machine vision systems, or the like.

The detection devices 72 are operable to transmit a confirmation signal 48 to the control module 20 along link 74 upon selection by the operator 12 of a part from a particular storage location 70, with control module 20 being functional to determine whether or not the operator 12 has selected the correct part as prompted. In response to the confirmation signal 48, if the operator 12 selected the proper part as directed by the indicating light 46, control module 20 may terminate the indicating light 46 projecting from directional light device 22 at the storage location 70 and transmit a subsequent command signal 50 to directional light device 24 to project an indicating light 52 to the operational step location 54 on the work piece 14 where the just selected part is to be assembled. However, if control module 20 determines that an incorrect part has been selected as compared to what should have been selected as prompted by the indicating light 46, control module 20 will not provide the subsequent command signal 50. In addition, control module 20 may be constructed to provide a visual or audible signal to the operator 12 when an improper part has been selected from a storage location 70. For example, although not illustrated, control module may prompt a visible alert, such as a red warning light mounted in the vicinity of the operator, to activate or illuminate, or may cause an audible alert, such as a warning alarm or buzzer to sound. Still further, an error message may be displayed by display device 36 or projected by a light device 22, 24. For example, the word "error" may be projected by a light device 22, 24 onto a surface of assembly line 18, or a work station 16, 58, 60.

Although not illustrated, the parts bin may additionally employ a known pick-to-light system whereby each storage location includes an illumination device, such as an LED light or the like, that lights up to prompt the operator as to the proper storage location from where a part is to be selected. When the assembly guide system of the present invention includes such a pick-to-light system, the directional light device 24 used to project an indicating light 46 at a component location 32 may optionally be excluded.

As noted above, assembly guide system 10 includes confirmation module 28, which in the illustrated embodiment is a foot pedal 30. Confirmation module 28 is constructed to transmit a confirmation signal 56 along link 76 to control module 20 to signal that the operational step indicated by directional light device 22 or 24 has been completed. To transmit the confirmation signal 56, operator 12 simply depresses foot pedal 30 upon completion of the directed activity. The confirmation signal 56 transmitted by foot pedal 30 then triggers control module 20 to selectively transmit another command signal 44, 50 to provide guidance to the operator 12 regarding the subsequent operational step that must be taken by the operator 12 at the work station 16 in accordance with work piece 14. For example, the assembly guide system 10 may cause an indicating light 46 to be projected at a storage location 70 for the next required part. Alternatively, the control module 20 may provide a command signal that releases the work piece to the next work station 58 if all of the operational steps at the current work station 16 have been completed.

Although illustrated as a foot pedal 30, it should be understood that numerous alternative confirmation modules 28 may be utilized and still function as intended within the scope of the present invention. For example, confirmation module 28 may be constructed as a pressure sensitive mat, push button, toggle switch, palm button, light curtain, touch screen, touch pad, or the like, which is constructed to be depressed, switched, or otherwise activated by a manual action of the operator 12. A sound activated signal may alternatively be employed, such as a voice command, to provide a confirmation signal. Confirmation module 28 may also be constructed as a wireless transmitter, such as a transmitter that an operator may carry by affixing to his or her belt, or the like, thereby eliminating the need for a physical link. Further, operational guide system may be adapted to receive and/or respond to other confirmation signals and/or sources as additional technologies become available such as, for example, the potential future computer technology of reading an operator's mind.

Still further, a confirmation module or device or element may be constructed to automatically detect when an operator has completed an assembly step. For example, a confirmation module may be constructed as a vision system that is able to detect the presence or absence of a component at a location, such as by processing an image captured by a pixilated imaging device, as is known in the art. Alternatively, for example, the confirmation module may be constructed as a proximity sensor, photo eye, light curtain, or the like, constructed to automatically detect the presence or absence of a part upon assembly to the work piece. Still further, a confirmation signal may be transmitted by an automated tool or measuring device, such as a weight scale or other type of measuring device, as described in more detail below. In which case, the automated tool or measuring device may function as a confirmation module. An indicating light projected by a light source of an operational guide system may also be used to provide a confirmation signal where, for example, a sensor is employed at the light source or elsewhere on the operational guide system to detect the reflection of an indicating light from a part or component that requires verification. Still further, the indicating lights projected by the light sources of an operational guide system may be used in connection with a light detecting sensor to detect, for example, a part height or other part feature. The light sources may also be used as a "light curtain" by being projected at a particular location or parts bin, or the like, with a sensor adapted to detect that an operator has properly selected from that location.

It should also be appreciated that an operation information could be transmitted to the controller 20 from a remote signal. For example, in the case of a part kitting operation, an order request may be transmitted to a work station from a central processing location, such as a computer system or the like, and transmit a signal to the work station regarding, for example, what parts to gather and/or assemble. In which case, the work piece of the operation may comprise a collection of parts assembled into a parts holder. A work piece may also comprise a food or drug item to which ingredients, components, or portions are added. Similarly, the transmission of an order request may also generate an assembly operation, such as in the case of, for example, custom assembled goods, such as a personal computer or laptop computer.

Although not illustrated, an assembly guide system may also incorporate known ultrasonic technology used to confirm, for example, that a tool is placed onto the proper bolt or nut at an assembly operation. Such ultrasonic technology is configured to send and receive ultrasonic frequencies with the spatial location of a sent or received signal being monitored to confirm that an operation is performed at a proper location. Thus, an assembly guide system may be configured to utilize both light sources and ultrasonic projection technology to guide and confirm assembly.

Assembly guide system 10 also includes a display device 36 that is able to receive display signals 78 (FIG. 2) along link 80 (FIG. 1) from control module 20 and to relay information to the operator 12. Display device 36 may be constructed as a television, LCD, LED device, or other type of viewable display mechanism. Display device 36 may be used to present information to the operator 12 such as, for example, the sequential steps needing to be performed, work instructions associated with the work station 16, images of a work piece 14 properly affixed with the part that is to be assembled, information regarding a missed or improperly performed assembly step, or the like. In the case of sequential steps, display device 36 may be configured to highlight the current step under consideration and/or provide an indication that previous steps have been completed. The display device 36 may be constructed as a touch screen device adapted to be depressed by an operator to provide a confirmation signal regarding completion of a particular step. The inclusion of such a touch screen device may also provide the ability to prompt or guide an operator through certain operational or assembly steps that do not require guidance via indicating light signals. The display device may also be used to show or provide instructional videos, display running cycle times, desired cycle times, and/or alerts, or the like. In the case of a touch screen, the touching by an operator of a particular location or tab area of the screen may display of a video or an image on the display screen, or another display screen, or may initiate the projection of an indicating light or video. It should be understood, however, that an assembly guide system may be constructed without a display device and still function as intended within the scope of the present invention.

Although not shown, one or more additional display devices may also be included with an operational guide system of the present invention. For example, a first display device may be used to display sequential operational steps, such as steps completed, the current step needing to be performed, and subsequent yet to be performed steps with the second display device used to display work instructions and/or a blueprint of the assembly. In such an embodiment, the displayed blueprint may be sequentially highlighted to indicate the particular component or feature associated with the sequential operational steps.

Optionally, assembly guide system 10 may be used in connection with a tool 38 and a tool holder 40. Tool 38 may comprise, for example, a manual tool such as a wrench, torque wrench, pliers, screwdriver, or the like, or may be an automated tool such as an electric screwdriver, air gun, electric torque wrench, or the like. Tool 38 may otherwise be a manual or automated measuring device such as calipers, a gauge block, feeler gauges, air gauge device, or the like. Tool holder 40 is intended to provide a storage location for tool 38 when tool 38 is not in use. Directional light devices 22, 24 may project an indicating light onto tool 38 and/or tool holder 40 in response to a command signal when tool 38 is required to complete a pending operational step, such as in a similar manner as described above with respect to storage locations 70 of parts bin 34 and operation step locations 54 on work piece 14. Tool holder 40 may include a sensor and thereby be integrated with the assembly guide system 10 to detect when tool 38 is positioned within or removed from tool holder 40, where the sensor may be a photo eye, proximity switch, light curtain, or the like. In such an embodiment, as illustrated, tool holder 40 may be in communication with control module through link 82 (FIG. 1) such that a confirmation signal 84 (FIG. 2) may be transmitted from tool holder 40 to control module 20 to indicate that operator 12 has properly selected the tool 38 as prompted.

Although not illustrated, the assembly guide system may utilize an automated gauge or tool that is electrically linked to control module such that control module is able to monitor both the use of the tool as well as an operational parameter associated with the tool, without affecting the scope of the present invention. For example, if a tool is constructed as a torque wrench, the control module may be constructed to monitor the fastening torque obtained by the torque wrench and to compare the value to a preprogrammed or predetermined or threshold value prior to transmitting a subsequent command signal. The control thus may function to transmit the subsequent command signal only after the desired or appropriate torque has been applied by the torque wrench. Similarly, if the tool is constructed as a measuring device, such as digital calipers, control module may be constructed to receive a measurement value, and may compare the measurement value to a threshold measurement value, and may communicate or transmit the subsequent command signal when the measurement value is at or near the threshold measurement value.

It should also be appreciated that a tool holder may be alternatively constructed as a holding device adapted to receive a marking device or a container of adhesive, lubricant, cleaner, or other holder of other suitable or useful elements or devices or materials, or the like that may be used in the process steps at a work station.

Control module 20 is illustrated as transmitting command signal 44a to directional light device 22, which in response to command signal 44a, projects indicating light 46a on storage location 70a of parts bin 34. Upon receiving confirmation signal 48a from detection device 72 signifying that the proper part was selected, control module 20 then terminates projection of indicating light 46a and transmits command signal 50a to directional light device 24 such that indicating light 52a is projected on operational step location 54a on work piece 14 to direct operator 12 as to the proper assembly point for the selected part. Operator 12 then activates foot pedal 30 (or other confirmation device), which transmits confirmation signal 56a to control module 20 and the above process is repeated for indicating lights 46b, 52b, 46c, 52c, storage locations 70b, 70c, and operational step locations 54b, 54c.

As described in more detail below, the control module 20 and directional light devices 22, 24 of the assembly guide system 10 are programmed as to the proper spatial positioning to where an indicating light 46, 52 is to be projected. This teaching of the assembly guide system 10 may be accomplished in various ways. For example, one teaching method involves the use of known pendant device technology, where the pendant device is used to position the projected beam of the light source 66 to a proper location, such as a storage location 70, record the coordinates, and then move to the next location, such as onto the work piece 14. Control module may also be adapted to employ voice activated programming.

Alternatively, a wireless transmitter may be used that may be positioned at a desired impingement point of the projected indicating light 46, 52 and functional to transmit the spatial positioning information to the control module. Similarly, various locations, such as part bins, may be provided with wireless transmitters, such as RFID tags, with the control module being adapted to detect the signal and direct the indicating lights accordingly, in which case the operational guide system is able to compensate for movement or shifting of the desired impingement points of the indicating lights. Still further, control module 20 may be directly programmed and, for example, may utilize a touch screen having an image of the work station with the control module 20 being programmable using the touch screen. An operational guide system may also alternatively be programmed via a computer, such as desktop or laptop or networked computer, without the above noted peripheral equipment. The operational guide system may also employ an alignment test pattern that may be used to "calibrate" the system, such as at the beginning of a shift, to insure that the various indicating light signals are properly aimed.

Figure 3:
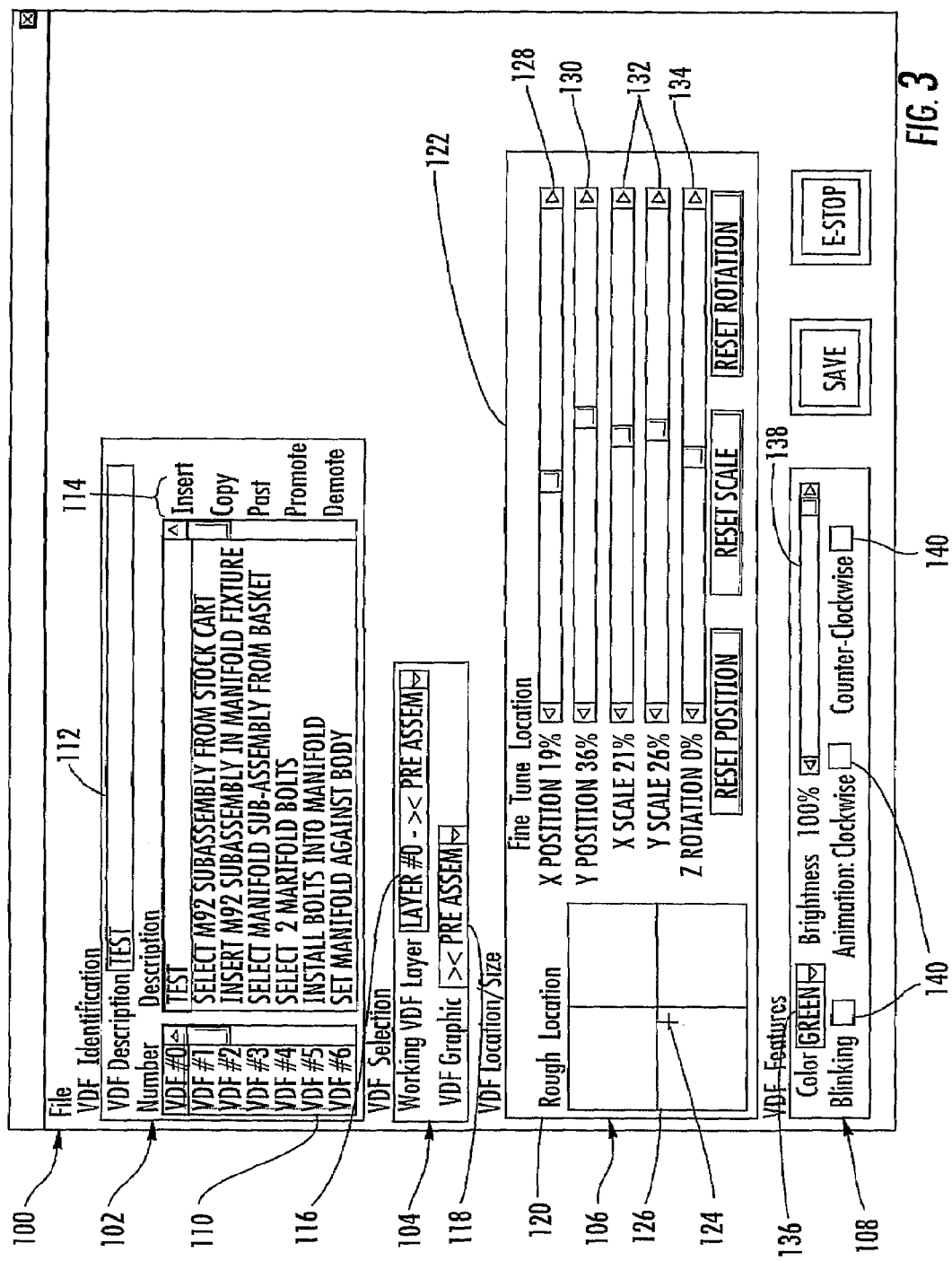
FIG. 3 is an illustration of a program screen generated on a display device used to program operational guide system software in accordance with the present invention.

The operational programming and use of an operational guide system will now be described with reference to FIGS. 3-5. FIG. 3 illustrates a program screen 100 that may be displayed or generated on a display device by a control module, such as display device 36 and control module 20. Program screen 100 includes various fields 102, 104, 106, 108 for entering descriptive text regarding an operational step, for selecting a type of display graphic or visual display feature ("VDF") and characteristics for the VDF to be exhibited by an indicating light, such as indicating light 46 or 52, and for programming the location at which an indicating light VDF will be directed via the control module.

The VDF description field 102 enables the operational guide system to be sequentially programmed with progressive operational steps, each of which may include certain selectively input descriptive text. For example, an operational step number may be selected from the scroll down number sub-field 110 with descriptive text being assigned to that operational step number by being entered or typed in VDF description sub-field 112, such as by a keyboard (not shown). VDF description field 102 further includes various commands 114, such as "Insert", "Copy", "Paste", "Promote", and "Demote" for accepting a particular operational step number and corresponding text, and for propagating or copying additional operational steps.

The VDF graphic selection field 104 enables various sub-steps or layers and graphics to be selected and programmed corresponding to a single operational step detailed in the VDF description field 102 noted above. For example, a single operational step detailed in the VDF description field may be specified as "Mount manifold." In order to accomplish this step, an operator may be required to perform various sequential sub-steps or layers, such as, for example, selecting a bolt, inserting the bolt through a hole in the manifold, selecting a washer, mounting the washer to the bolt, selecting a nut, and mounting and tightening the nut to the bolt. These various sub-steps may be selected and programmed in the VDF graphic selection field 104.

The VDF graphic selection field 104 includes a VDF layer sub-field 116 and a VDF graphic selection sub-field 118. In the illustrated embodiment, the VDF layer sub-field comprises a drop down menu enabling up to fifteen layers or sub-steps to be associated with a single operational step. Descriptive text regarding the sub-step, such as "Select Bolt," may be input within the VDF layer sub-field 116. The VDF graphic selection sub-field 118 enables a pre-programmed image, video, blueprint, or the like, to be selectively associated with the sub-step entered in the VDF layer sub-field 116. In the illustrated embodiment, VDF graphic selection sub-field 118 is a drop down menu enabling selection of pre-programmed images such as, for example, arrows, various geometric shapes, such as circles, triangles, squares, and the like.

The VDF location field 106 is used to program the location at which the graphic associated with a particular operational step and/or sub-step is to be projected by a light device, such as directional light devices 22 or 24. In the illustrated embodiment, the VDF location field 106 includes an initial or rough location sub-field 120 and a secondary or fine tune location sub-field 122. While in the programming mode, the graphic may be constantly displayed to enable the graphic to be appropriately positioned. The initial location sub-field 120 enables the position of the projected graphic to be positioned via a cursor 124 moveable by a mouse device (not shown). Clicking on the cursor 124 and dragging the cursor within the display field 126 correspondingly causes the directional light device to move and position the graphic. A touch screen device may alternatively allow a cursor to be moved via a user's finger. Upon obtaining a location for the projected graphic using the initial location sub-field 120, the secondary location sub-field 122 may be used to further locate the graphic if required. The secondary location sub-field 122 includes first and second axis slider bars 128, 130 for moving the graphic in first and second axis. The secondary location sub-field 122 further includes slider bars 132, 133 for altering the scale of the first and second axis, which act as a multiplier or reducer to the movement of the graphic by a light device via the first and second axis slider bars 128, 130. The secondary location sub-field 122 also includes a third axis rotation slider bar 134 that is used to rotate the displayed graphic, such as a directional arrow or written text, such that the graphic is displayed in an appropriate manner, such as pointing at a particular part or feature or displayed such that it is readable from left-to-right.

The VDF feature field 108 is used to provide further customization to the displayed graphic. A drop down color menu 136 is provided to alter the displayed color of the graphic and a brightness slider bar 138 is provided for adjusting the intensity of the displayed image. Various further selectable feature display options 140 may also be provided such as, for example, a blinking display option used to cause the graphic to flash, and rotational display options to cause the graphic to rotate in either a clockwise or counter-clockwise fashion. It should be appreciated that various additional selectable graphic customization options may be provided within the scope of the present invention.

Figure 4:
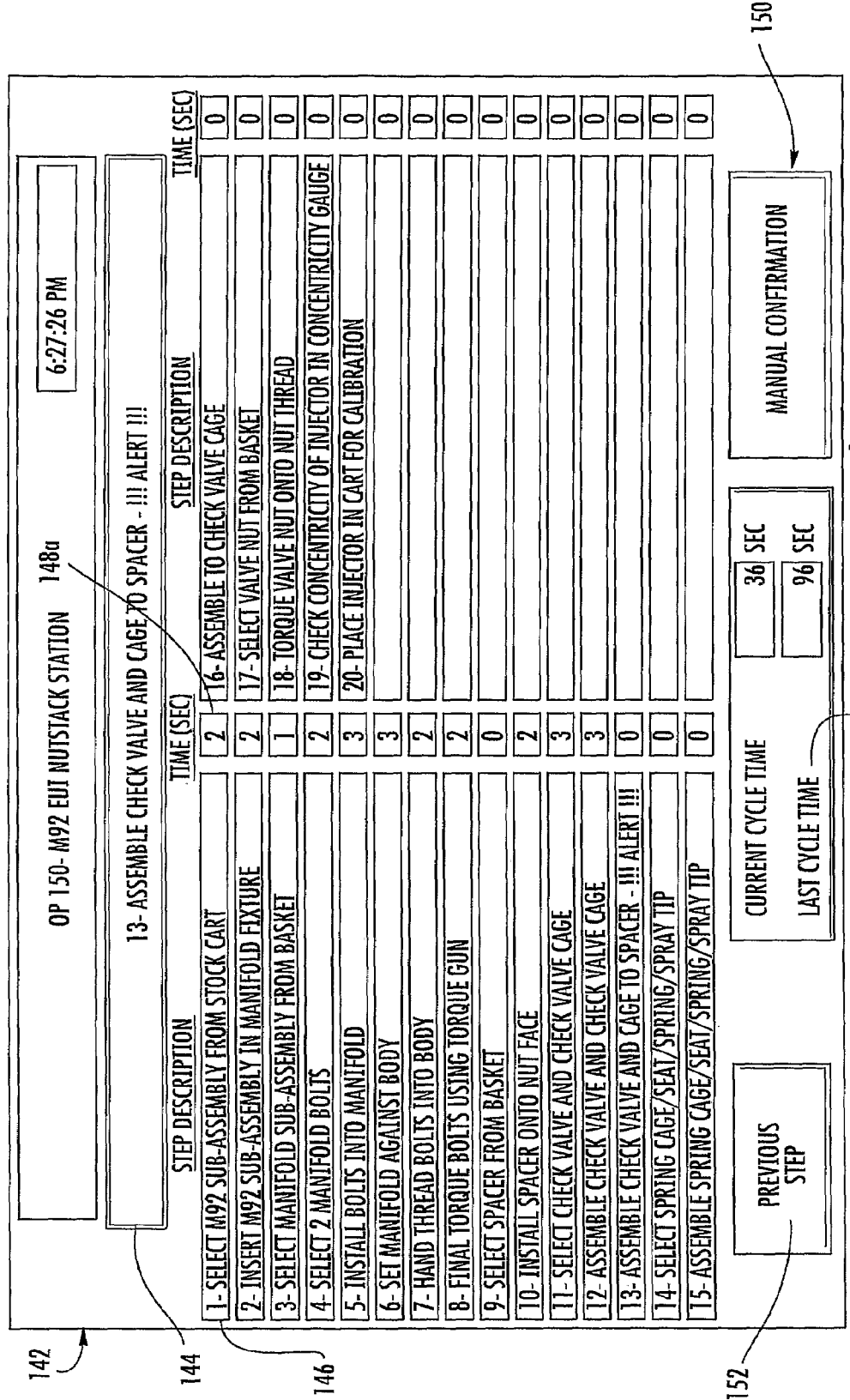
FIG. 4 is an illustration of an operator display screen generated on a display device of the operational guide system in accordance with the present invention.
Figure 5:
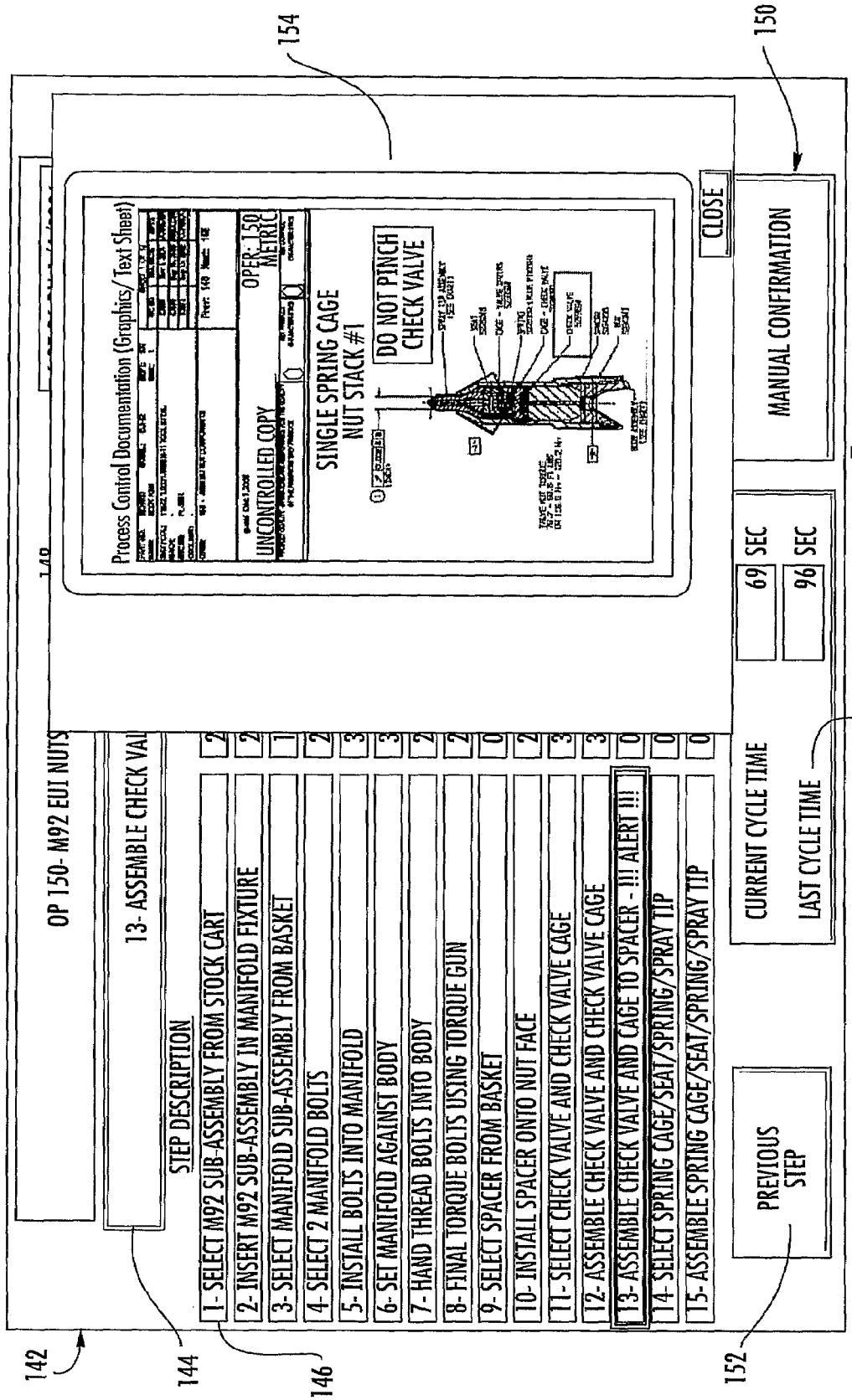
FIG. 5 is an illustration of the operator display screen of FIG. 4 shown with an additional display image in accordance with the present invention.

Referring now to FIGS. 4 and 5, operator display screens 142 generated on a display device, such as display device 36, are illustrated that may be displayed while operating the operational guide system in a "run" mode. Display screen 142 discloses a header field 144 listing the particular operational step that is to be or is being performed. Display screen 142 also includes an operational step listing field 146 that may provide a list of the various operational steps that are to be performed at, for example, a particular assembly station. In use, the first operational step to be performed is displayed within the header field 144 and the operator is then guided through the various sub-steps associated with that operational step. Confirmation signals are provided upon completion of each sub-step either manually by the operator or automatically via other means described above. Upon completion of all sub-steps associated with an operational step, the next operational step to be performed is displayed in the header field.

It should be appreciated that alternatively configured programming interfaces provided by, for example, a programming software for an operational guide system may be employed to enter and propagate commands into the system. For example, although description field 102, graphic selection field 104, location field 106, and feature field 108 are all simultaneously disclosed on program screen 100, it should be appreciated that an alternative software, for example, may incorporate separate programming screens for each of a description field, graphic selection field, location field, and a feature field. Further, the various attributes or elements of such fields, such as the above noted sub-fields, sub-steps, and/or slider bars, may also be incorporated on separate screens or pop-up screens. Furthermore, fields or screens may be provided for browsing or scrolling to link or associate an image, blueprint, video, or the like, with a particular step. Still further, such a programming interface may be provided in the form of a "programming wizard" configured to sequentially guide a programmer through the entering and propagating of commands into the system.

Display screen also includes cycle time monitoring display fields 148a and 148b which may be used to display to an operator the running time associated with performance of an operational step, previous running times, average running times, and/or target times for completion of the operational steps. For example, cycle time monitoring display field 148a may show the cycle time to perform one or more previous or completed operational steps, while cycle time monitoring display field 148b may show the cycle time of the preceding and current operational step. A cycle time measurement may, for example, be initiated upon receipt of a first input signal 42 from sensor apparatus 26, and completed upon detection of a confirmation signal 48, 56, 84. Display screen 142 also includes a manual confirmation button 150 that may be used to provide a confirmation signal to a control module. Display screen may be constructed as a conventional touch screen to enable the operator to physically touch the confirmation button, as with a finger, and/or may be "clicked" via a mouse, in which case display screen may alternatively be a conventional monitor. Display screen may also include a back button 152 to enable an operator to repeat or check steps associated with prior operational steps.

FIG. 5 illustrates display screen 142 with an additional display window 154 that may be displayed to provide additional guidance or direction to an operator for a particular operational step. In the illustrated embodiment, window 154 is displaying work instructions pertaining to the operational step being performed. Although not shown, window 154 may also color code or provide animation to the display. Display window 154 may be caused to automatically appear on display screen 142 upon reaching the associated operational step or may be selectively displayed by an operator as needed.

As previously noted, control module 20 may also be used to monitor and record various parameters useful for improving productivity. For example, control module 20 may record cycle times of the individual operational steps at a work station 16 and/or the combined cycle time of operations at a work station 16. Such information is beneficial for balancing cycle times on the assembly line 18 to provide even work flow and for monitoring operator performance. The control module 20 may also be used to monitor and record the duration of time between a work piece 14 exiting a work station 16 and the next work piece entering the work station 16, which is useful for calculating the downtime of a given work station to focus efforts on upstream operations. In addition, the control module 20 may be used to monitor and record the duration of time a work piece is not able to exit a work station upon completion of all assembly actions at a particular work station due to a blocked or slower downstream operation. Further, an operator may be required to sign-on and sign-off at the start and end of his or her shift such that performance tracking to individual operators may be obtained. Correspondingly, control module 20, or another such computational device, may record and provide charts or reports regarding recorded error data, such as on mis-performed steps, and/or cycle times. In addition, such data may be linked or otherwise networked, or even monitored via the internet, such that the variously above noted cycle times or performance parameters may be monitored from a remote computer, with such data being viewable in a live format or archived. The above noted information being a useful tool to supervisors, process engineers, and/or operational managers in identifying and continuously improving production operations.

Although not shown, it should also be appreciated that the operational guide system may be adapted to additionally provide audio guidance and/or instruction, such as voice or sound type instruction. For example, an operational guide system may be adapted to enable the entering or programming of verbal instructions that are output by the operational guide system, such as to a speaker or headphones worn by an operator. Such audio guidance may be programmed to the control module, for example, as part of the layered programming discussed above in regard to the VDF graphic selection field 104, where audio output commands may be supplied or programmed to the system via a microphone, or the like, or may alternatively include selectable preprogrammed audible commands that may be associated with a sub-step.

It should be appreciated that numerous alternative structures and methods are contemplated within the scope of the operational guide system of the present invention. For example, an operational guide system need only utilize a single directional light device for projecting indicating lights at both a component location as well as operational step locations on a work piece. An operational guide system also need not employ a component location, but rather may employ one or more tools with directional light devices functioning to project indicating lights at the various tools. Furthermore, it should also be appreciated that the assembly guide system 10 of FIGS. 1 and 2 may be alternatively constructed whereby the various links are not formed by computer cables or the like, but are rather formed as wireless connections between the various devices. Still further, each assembly step need not involve both the selection of a part and the assembly of the part to a work piece.

Operational guide systems may also be incorporated into assembly line systems with the guide systems simultaneously moving along with the item or device being assembled or constructed on the assembly line. For example, an operational guide system may be affixed to a moving assembly line or a fixture used in association with such an assembly line, such as an automotive vehicle assembly line. In such case, the operational guide system may be employed to prompt or aid the progression of numerous operational assembly or qualification steps.

It should also be appreciated that the operational guide system of the present invention may be configured for use with a stand alone work station as opposed to a work station integrated into an assembly line as shown in FIG. 1. For example, an operational guide system may be constructed as a stand alone testing or gauging station using multiple tools formed as testing devices, such as air leak testers or the like, or gauges that are used to evaluate one or more characteristics, parameters, or dimensions of a work piece. A stand alone operational guide system may also be used as a training station, such as for new employees or to aid in the introduction of a new part or assembly step. An operational guide system training station may also be used for physical rehabilitation or job training programs. Still further, an operational guide system may be constructed as a standalone station or cart that may be docked or aligned with a particular operational step, such as on an assembly line, for use at only limited times in conjunction with the operational step. In such an embodiment, for example, the operational guide system may include sensors, or the like, for identifying or detecting the particular station to which the guide system is adjacently positioned. The operational guide system may, thus, be mobile such that it may be moved and/or re-positioned for use with other assembly operations, components, and/or at other locations.

Although the operational guide system of the present invention is discussed above in regard to assembly operations and testing operations, it should also be appreciated that numerous alternative uses and/or configurations of the operational guide system of the present invention exist. For example, an operational guide system may be used to pick and package products into a shipping container, such as a bag or box, for fulfilling an order, such as part kitting at order fulfillment centers, supermarkets, part bin loading, or the like. In such an embodiment, the shipping container may be associated with a bar code order number that would provide information to the control module as to the particular products needed for filling the order. Alternatively, a signal may be supplied, such as from a remote order input or collection computer, to a control module for directing assembly of a component or parts. In such an embodiment, the order input or collection computer may comprise a sensor apparatus and the assemblage of parts or components may comprise a work piece, even if initially no components are assembled or collected to define or form a work piece. The operational guide system may also be used in a food production or preparation process in which, for example, the indicating lights may be projected onto sequentially required ingredients and may be timed depending upon when a particular ingredient is to be added. In like manner to a food production or preparation process, the operational guide system may also be configured for use in the production of non-edible chemical compositions such as welding fluxes, salves, creams, ointments, soaps, shampoos, drugs, and the like. It is envisioned that the guide system of the present invention may be suitable for other applications involving a step-by-step process by a human operator. The operational guide system may also be used in alternative environments, such as underwater for training astronauts, Navy Seals, underwater fabricators, and the like, or may even be used in outer space as a guided instructional tool inside or outside a space shuttle and/or space station.

Still further, the operational guide system of the present invention may be used in connection with the cockpit of an airplane as a pilot checklist, with the control module adapted to receive, for example, information regarding the type of plane, duration of flight, and/or weather conditions. The operational guide system of the present invention may also be used in connection with multi-person choreographed activities, such as football plays, automobile racing pit stops, marching band numbers, and dance routines. Regarding football plays, for example, the control module may be programmed to direct multiple plays and adapted to receive information regarding a particular defense. Regarding automobile racing pit stops, for example, the control module may be adapted to receive information regarding the amount of fuel remaining in the race car, the number of laps left in the race, and/or the number of laps run using a particular set of tires. The operational guide system of the present invention may also be incorporated with a global positioning satellite (GPS) system adapted to provide positioning information to the control module whereby command signals may be output such that the directional light devices provide geographical location direction guidance. Such a GPS incorporated operational guide system may be beneficial, for example, in guiding military operations. Still further, the operational guide system may include ultrasonic positioning technology, or other such positioning technology, to enable directional guidance and/or position monitoring capabilities.

The operational guide system of the present invention thus provides a cost effective and accurate method of guiding an individual through a series of tasks and provides confirmation that the tasks have been completed in the proper order. The operational guide system is useful in a wide array of applications, such as assembly, packaging, process preparation, and the like. Furthermore, the ability of the assembly guide system to recognize the presence, type, and/or relative position of a part or item or article present at a work station and to adapt or modify a command output based on the type or position of the part provides a flexible system that enables different types or models of parts to be processed at a particular work station, as well as provide notification to an operator of the presence of a work piece at the work station and thereby improves throughput of the assembly line. The control module may also be used to monitor cycle times of the individual operational steps and combined operations undertaken at the work station, and to confirm that a proper part has been selected by an operator prior to proceeding to the next operational step. The operational guide system also provides an effective means of training individuals with regard to various activities, which is desirable in environments involving, for example, significant employee turnover and/or language and literacy barriers.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. An operational guide system adapted to provide visual indicators to an individual to guide sequential actions, said operational guide system comprising:
   at least one sensor apparatus, said at least one sensor apparatus operable to detect operation information and generate an output indicative of said operation information;
   a controller, said controller receiving at least a first input signal indicative of said operation information and selectively providing at least one command signal in response to said first input signal; and
   at least one directional light device, said at least one directional light device selectively operable to project and target at least one indicating light in response to said at least one command signal from said controller.

2. The operational guide system of claim 1, wherein said at least one indicating light is provided to an operator performing an assembly action at a work station.

3. The assembly guide system of claim 2, wherein said at least one indicating light is projected at a component location, said component location retaining a part required for assembly at said work station.

4. The assembly guide system of claim 2, wherein said operation information comprises identification of a presence of a work piece at said work station.

5. The assembly guide system of claim 4, wherein said operation information comprises identification of a type of the work piece at said work station, and wherein said at least one command signal is selectively provided depending on the type of the work piece identified.

6. The assembly guide system of claim 2, wherein said at least one indicating light is projected at a work piece to indicate an operation step location.

7. The assembly guide system of claim 1, wherein said controller is adapted to receive at least one confirmation signal indicative of a completion of an assembly action, said at least one confirmation signal comprising at least one signal selected from the group consisting of a manually input signal and an automated input signal.

8. The assembly guide system of claim 1, wherein said at least one indicating light is produced by at least one high intensity light emitting device selected from the group consisting of a laser projector, a digital light projector, and a liquid-crystal display.

9. The assembly guide system of claim 1, further including a display device, and wherein said controller is programmable via at least one program screen displayable on said display device, said at least one program screen configured to include at least one input field for entering and/or selecting indicia regarding sequential actions;

said controller being further configured to display at least one display screen on said display device during operation of said operational guide system, said display screen being adapted to display indicia regarding sequential actions to be performed.

10. The assembly guide system of claim 9, wherein said at least one input field comprises at least one selected from the group consisting of a description field, a graphic field, and a location field, and wherein said description field is configured to enable programming of descriptive text associated with sequential actions, said graphic selection field is configured to enable programming of an image formed by said at least one indicating light, and said location field is configured to enable programming of the location at which said at least one directional light device projects said at least one indicating light.

11. The assembly guide system of claim 1, wherein said controller is configured to monitor operational information associated with sequential actions.

12. The assembly guide system of claim 11, said operational information including at least one selected from the group consisting of a cycle time, an incorrectly performed action, a time between sequential actions, and an operator identification.

13. The assembly guide system of claim 1, further including a display device, said display device being operable to display information regarding sequential actions.

14. A method for guiding assembly actions by providing visual indicators, said method comprising:

identifying a characteristic of a work piece requiring assembly actions;

communicating identification information to a controller in response to the identifying of a characteristic of the work piece;

communicating a first command signal to at least one directional light device in response to the identifying of a characteristic;

selectively projecting at least one indicating light via the directional light device in response to the first command signal; and communicating a confirmation signal to the controller upon completion of a first operation step.

15. The method of claim 14, wherein identifying a characteristic of a work piece comprises identifying the presence of a work piece with a sensor apparatus.

16. The method of claim 15, including identifying the type of work piece requiring assembly actions.

17. The method of claim 14, wherein projecting at least one indicating light comprises projecting at least one indicating light toward at least one of a component location and an operation step location.

18. The method of claim 14, wherein projecting at least one indicating light comprises projecting at least one indicating light in a selectively configurable pattern.

19. The method of claim 14, wherein communicating a confirmation signal comprises communicating a confirmation signal from at least one selected from the group consisting of a manual input signal and an automated input signal.

20. The method of claim 14, including:

communicating a second command signal from the controller to the at least one directional light device in response to the confirmation signal;

projecting at least one indicating light from the directional light device in response to the second command signal; and communicating a confirmation signal to the controller upon completion of a second operation step.

21. The method of claim 20, including:

repeating said communicating a command signal;

projecting at least one indicating light in response to said command signal; and communicating a confirmation signal until assembly actions for the work piece have been completed.

22. The method of claim 14, including:

programming the controller via at least one program screen displayable on the display device, the at least one program screen configured to include at least one input field for entering and/or selecting indicia regarding sequential actions; and displaying indicia indicia regarding sequential actions to be performed on at least one display screen displayable on the display device.

23. The method of claim 14, including:

monitoring operational information associated with sequential actions via the controller.

24. The assembly guide system of claim 2, further including a display device, and wherein said controller is programmable via at least one program screen displayable on said display device, said at least one program screen configured to include at least one input field for entering and/or selecting indicia regarding sequential actions;

said controller being further configured to display at least one display screen on said display device during operation of said operational guide system, said display screen being adapted to display indicia regarding sequential actions to be performed.

25. The assembly guide system of claim 2, further including a display device, said display device being operable to display information regarding sequential actions.

* * * * *

UNITED STATES PATENT AND TRADEMARK OFFICE
CERTIFICATE OF CORRECTION

Page 1 of 1

PATENT NO. : 7,515,981 B2
APPLICATION NO. : 11/909002
DATED : April 7, 2009
INVENTOR(S) : Paul Ryznar and James Ryznar It is certified that error appears in the above-identified patent and that said Letters Patent is hereby corrected as shown below:

In the Claims

Column 19
Line 1, Claim 3, "assembly" should be --operational--;
Line 5, Claim 4, "assembly" should be --operational--;
Line 8, Claim 5, "assembly" should be --operational--;
Line 13, Claim 6, "assembly" should be --operational--;
Line 16, Claim 7, "assembly" should be --operational--;
Line 22, Claim 8, "assembly" should be --operational--;
Line 27, Claim 9, "assembly" should be --operational--;
Line 38, Claim 10, "assembly" should be --operational--;
Line 48, Claim 11, "assembly" should be --operational--;
Line 51, Claim 12, "assembly" should be --operational--;
Line 56, Claim 13, "assembly" should be --operational--.

Column 20
Line 46, Claim 22, delete "indicia" after "indicia";
Line 52, Claim 24, "assembly" should be --operational--;
Line 63, Claim 25, "assembly" should be --operational--.

Signed and Sealed this
First Day of April, 2014

Michelle K. Lee
*Deputy Director of the United States Patent and Trademark Office*